(12) United States Patent
Kobune et al.

(10) Patent No.: US 10,300,895 B2
(45) Date of Patent: May 28, 2019

(54) BRAKE DEVICE

(71) Applicant: HITACHI AUTOMOTIVE SYSTEMS, LTD., Ibaraki (JP)

(72) Inventors: Tatsuro Kobune, Atsugi (JP); Wataru Yokoyama, Yokohama (JP); Kenichiro Matsubara, Kasumigaura (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/511,402

(22) PCT Filed: Dec. 25, 2015

(86) PCT No.: PCT/JP2015/086184
§ 371 (c)(1),
(2) Date: Mar. 15, 2017

(87) PCT Pub. No.: WO2016/104683
PCT Pub. Date: Jun. 30, 2016

(65) Prior Publication Data
US 2017/0291585 A1  Oct. 12, 2017

(30) Foreign Application Priority Data

Dec. 27, 2014 (JP) ................. 2014-266809

(51) Int. Cl.
*B60T 8/17* (2006.01)
*B60T 8/00* (2006.01)
(Continued)

(52) U.S. Cl.
CPC ............... *B60T 8/17* (2013.01); *B60T 7/107* (2013.01); *B60T 8/00* (2013.01); *B60T 13/74* (2013.01);
(Continued)

(58) Field of Classification Search
CPC .......... B60T 8/17; B60T 13/741; B60T 7/107; B60T 2201/06
See application file for complete search history.

(56) References Cited

U.S. PATENT DOCUMENTS 5,071,199 A * 12/1991 Spadafora ........... B60T 8/17616
303/162
2006/0163939 A1* 7/2006 Kuramochi ............. B60T 8/885
303/122.04

(Continued)

FOREIGN PATENT DOCUMENTS

JP     4-271945     9/1992
JP     2006-70962   3/2006
(Continued)

OTHER PUBLICATIONS

International Search Report dated Apr. 5, 2016 in International Application No. PCT/JP2015/086184.

*Primary Examiner* — Vishal R Sahni
(74) *Attorney, Agent, or Firm* — Wenderoth, Lind & Ponack, L.L.P.

(57) ABSTRACT

A brake device having an electric parking brake function, capable of appropriately performing stepwise increase control for a clamping force. A control unit including a computing circuit (20), a memory (21), and each motor drive circuit (23) of a parking brake control device (19) includes a stepwise increase control unit configured to increase the clamping force generated by brake pads (33) to a disc rotor (4) in a stepwise manner. When start of contact between the disc rotor (4) and the brake pads (33) caused by feeding of power from the parking brake control device (19) to an electric motor (43B) is detected based on a motor current from a current sensor unit (24), the stepwise increase control unit performs control for repeatedly feeding and stopping power to the electric motor (43B) to increase the clamping (Continued)

force in a stepwise manner in accordance with a predefined processing procedure.

12 Claims, 6 Drawing Sheets

(51) Int. Cl.
  *B60T 13/74* (2006.01)
  *B60T 7/10* (2006.01)
  *F16D 55/22* (2006.01)
(52) U.S. Cl.
  CPC ......... *B60T 13/741* (2013.01); *B60T 2201/06* (2013.01); *F16D 55/22* (2013.01)

(56) References Cited

U.S. PATENT DOCUMENTS

| | | | |
|---|---|---|---|
| 2008/0048596 A1 | 2/2008 | Konishi et al. | |
| 2013/0261917 A1 | 10/2013 | Kotake et al. | |
| 2014/0008967 A1* | 1/2014 | Takeuchi | B60T 13/161 303/155 |
| 2015/0298664 A1* | 10/2015 | Nimura | B60T 8/36 701/70 |

FOREIGN PATENT DOCUMENTS

| | | |
|---|---|---|
| JP | 2008-49800 | 3/2008 |
| JP | 2008-68838 | 3/2008 |
| JP | 2013-209041 | 10/2013 |

* cited by examiner

BRAKE DEVICE

TECHNICAL FIELD

The present invention relates to a brake device configured to apply a braking force to a vehicle.

BACKGROUND ART

As a brake device provided to a vehicle, for example, an automobile, there is known a brake device configured to apply or release a braking force with respect to wheels through drive control of an electric motor when the vehicle is parked or stopped (see Patent Literature 1).

CITATION LIST

Patent Literature

PTL 1: JP 2013-209041 A

SUMMARY OF INVENTION

Technical Problem

In Patent Literature 1, no consideration has been made on appropriately performing stepwise increase control for a clamping force when emergency stop control is performed.

The present invention has an object to provide a brake device capable of appropriately performing stepwise increase control for a clamping force.

Solution to Problem

In order to solve the above-mentioned problem, a brake device according to one embodiment of the present invention includes: braking members configured to clamp a braked member, which is rotated together with a wheel, to apply a braking force to a vehicle; a piston configured to move the braking members toward the braked member or in a direction away from the braked member; a linearly movable member configured to move linearly through driving of an electric motor and come into contact with the piston so as to move the piston; and a control unit configured to perform application control for applying the braking force to the vehicle through feeding of power to the electric motor and release control for releasing the braking force applied to the vehicle, in which, when start of contact between the braking members and the braked member is detected, the control unit performs stepwise increase control for increasing in a stepwise manner a clamping force applied by the braking members to the braked member through repeated feeding and stopping of power to the electric motor.

Advantageous Effects of Invention

According to the present invention, the stepwise increase control for the clamping force can be appropriately performed by the brake device.

DESCRIPTION OF EMBODIMENTS

Figure 4:
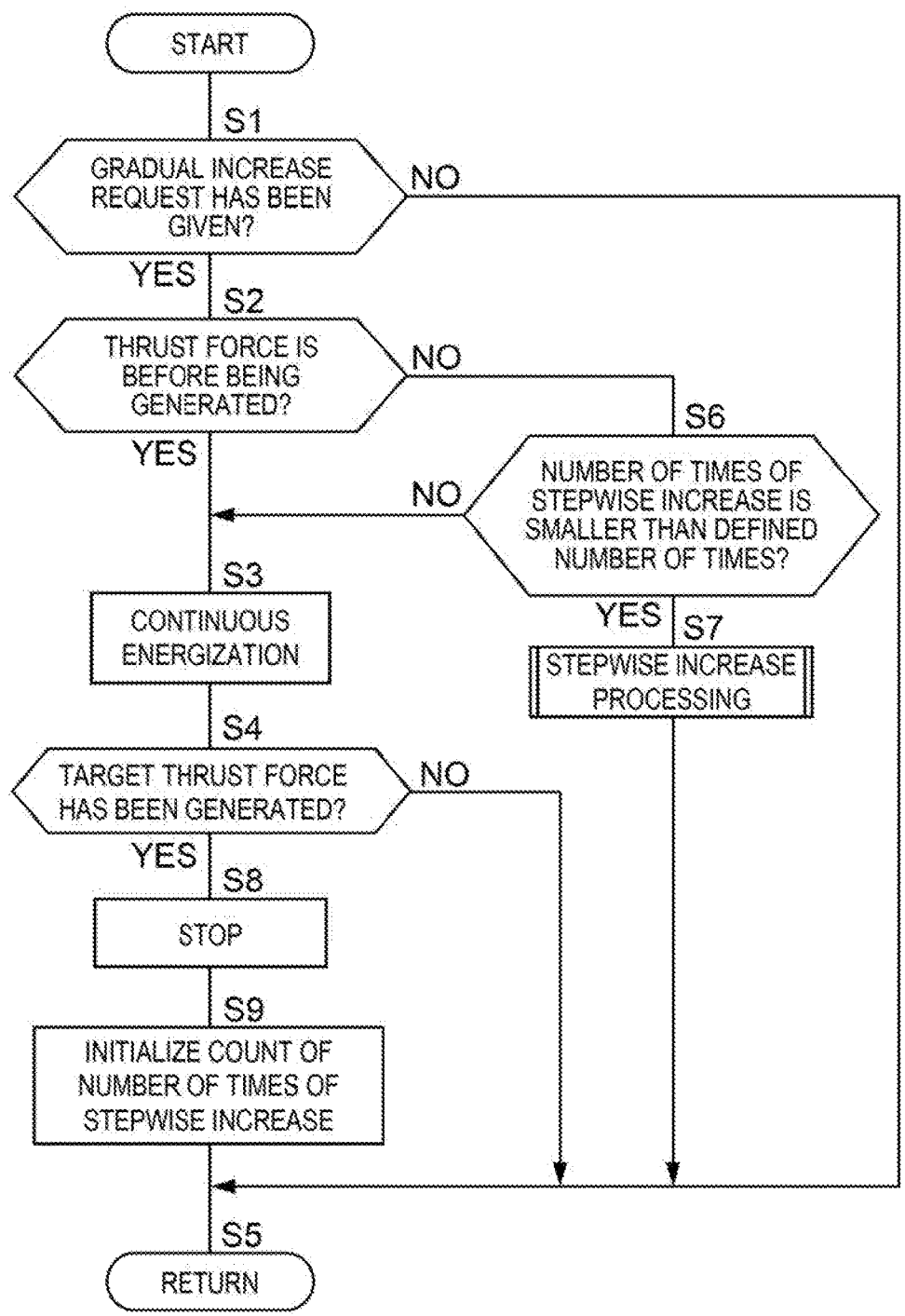
FIG. 4 is a flowchart for illustrating control processing performed when stepwise increase control for a clamping force is performed by the parking brake control device.
Figure 5:
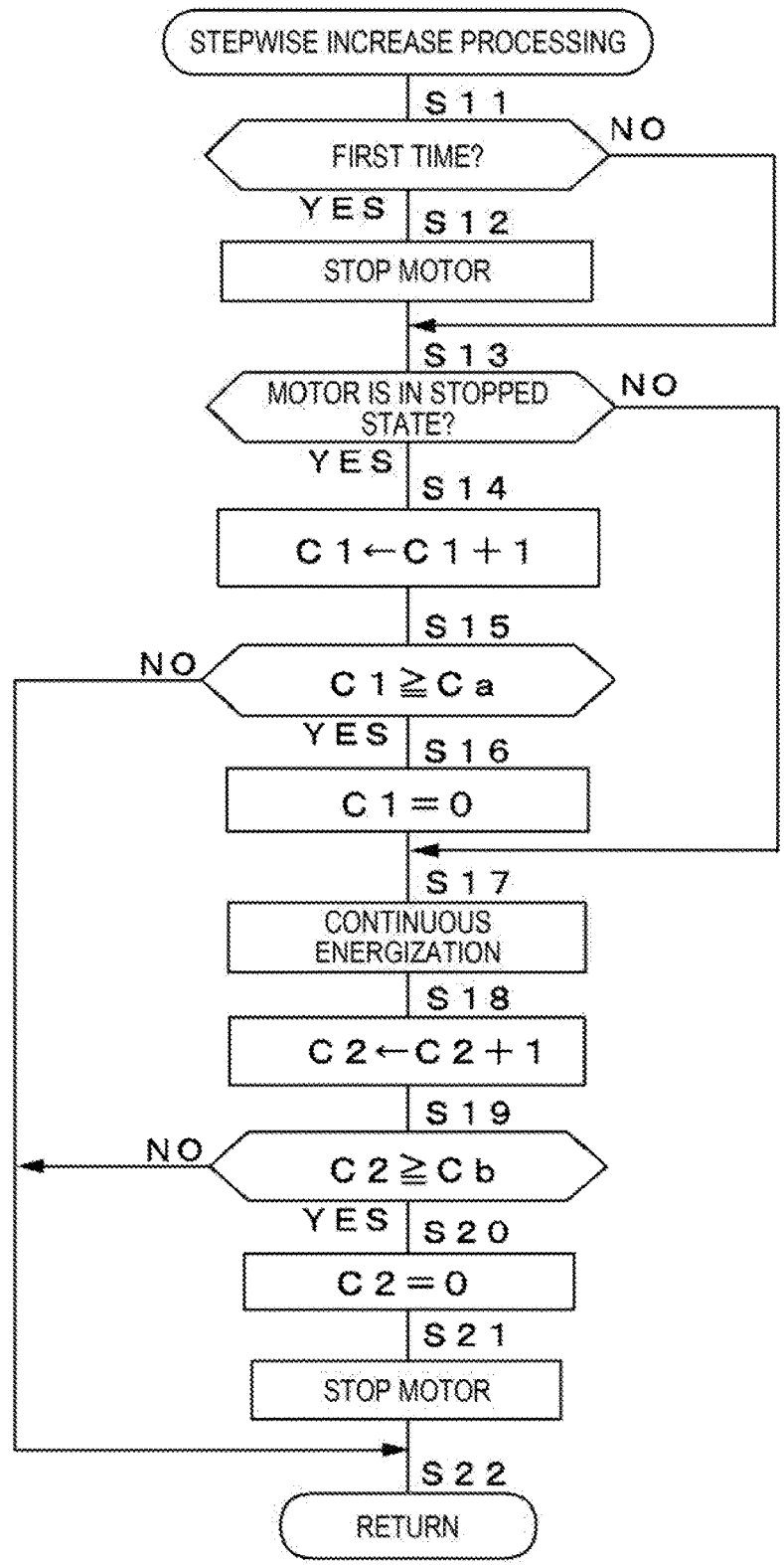
FIG. 5 is a flowchart for illustrating, in a detailed manner, the stepwise increase control illustrated in FIG. 4.

Now, a brake device according to an embodiment of the present invention is described with reference to the accompanying drawings, taking a case where the brake device is mounted in a four-wheeled automobile as an example. Each of steps of flowcharts of FIG. 4 and FIG. 5 is denoted with "S". For example, Step 1 is described as "S1".

Figure 1:
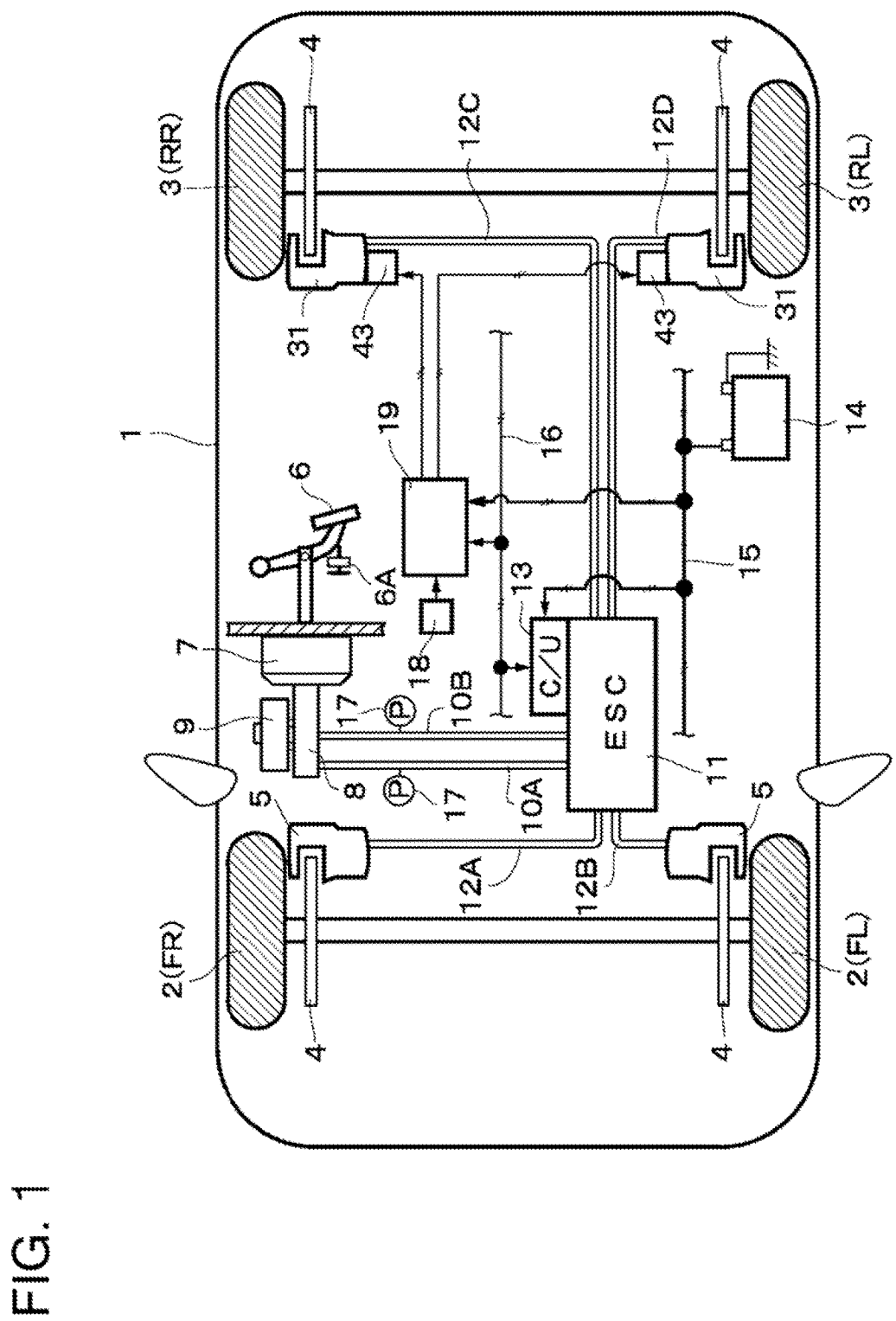
FIG. 1 is a conceptual view of a vehicle in which brake devices according to an embodiment of the present invention are mounted.

In FIG. 1, a total of four wheels including, for example, left and right front wheels 2 (FL, FR) and left and right rear wheels 3 (RL, RR) are provided to a lower side (on a road surface side) of a vehicle body 1 constructing a body of a vehicle. Disc rotors 4 serving as braked members, which are rotated together with the wheels (the front wheels 2 and the rear wheels 3) are provided to the front wheels 2 and the rear wheels 3, respectively. Braking forces are applied by hydraulic disc brakes 5 to the disc rotors 4 for the front wheels 2, respectively. Braking forces are applied by hydraulic disc brakes 31 each having an electric parking brake function to the disc rotors 4 for the rear wheels 3, respectively. In this manner, the braking forces are applied independently to the wheels (the front wheels 2 and the rear wheels 3), respectively.

On a front board side of the vehicle 1, a brake pedal 6 is provided. A stepping operation is performed by a driver on the brake pedal 6 at the time of a braking operation for the vehicle. Based on the operation, application and release of the braking force are performed as a service brake. A brake lamp switch, a pedal switch, and a brake operation detection sensor (brake sensor) 6A, for example, a pedal stroke sensor are provided to the brake pedal 6. The brake operation detection sensor 6A is configured to detect whether or not the depressing operation has been performed on the brake pedal 6 or the amount of operation thereof and output a detection signal to a hydraulic pressure supply device controller 13. The detection signal from the brake operation detection sensor 6A is transmitted via, for example, a vehicle data bus 16 or a signal line (not shown) which connects the hydraulic pressure supply device controller 13 and a parking brake control device 19 to each other, and is output to the parking brake control device 19.

The depressing operation of the brake pedal 6 is transmitted via a booster 7 to a master cylinder 8 functioning as a hydraulic pressure source. The booster 7 is constructed by a negative pressure booster or an electric booster provided between the brake pedal 6 and the master cylinder 8, and is configured to boost a stepping force at the time of the depressing operation of the brake pedal 6 and transmit the stepping force to the master cylinder 8. At this time, the master cylinder 8 generates a hydraulic pressure by a brake fluid supplied from a master reservoir 9. The master reservoir 9 is constructed by a working fluid tank which stores the brake fluid therein. A mechanism configured to generate the hydraulic pressure by the brake pedal 6 is not limited to the configuration described above, and may be a mechanism configured to generate the hydraulic pressure in accordance with an operation of the brake pedal 6, for example, a brake-by-wire mechanism.

The hydraulic pressure generated in the master cylinder 8 is transmitted to a hydraulic pressure supply device 11 (hereinafter referred to as "ESC 11") via, for example, a pair of cylinder-side hydraulic pressure pipes 10A and 10B. The ESC 11 is provided among the disc brakes 5 and 31 and the master cylinder 8, and is configured to distribute the hydraulic pressure transmitted from the master cylinder 8 to each of the disc brakes 5 and 31 via one of brake-side pipe portions 12A, 12B, 12C, and 12D. In this manner, the braking forces are applied to the respective wheels (front wheels 2 and rear wheels 3) independently of each other. In this case, the ESC 11 can supply the hydraulic pressure to each of the disc brakes 5 and 31, specifically, can increase the hydraulic pressures of the disc brakes 5 and 31 even in a mode in which the hydraulic pressure is not determined according to the amount of operation of the brake pedal 6.

Therefore, the ESC 11 includes a dedicated control device constructed by, for example, a microcomputer, specifically, the hydraulic pressure supply device controller 13 (hereinafter referred to as "control unit 13"). The control unit 13 is configured to perform drive control for opening and closing each control valve (not shown) of the ESC 11 or for rotating or stopping an electric motor for a hydraulic pump (not shown) to perform control for boosting, reducing, or maintaining the brake hydraulic pressures supplied from the brake-side pipe portions 12A to 12D to the respective disc brakes 5 and 31. In this manner, various types of brake control, for example, boost control, braking-force distribution control, brake assist control, antilock brake control (ABS), traction control, vehicle stabilization control including antiskid control, hill start aid control, and automatic drive control are executed.

Power from a battery 14 is fed to the control unit 13 through a power supply line 15. As illustrated in FIG. 1, the control unit 13 is connected to the vehicle data bus 16. In place of the ESC 11, a publicly-known ABS unit can also be used. Further, the master cylinder 8 and the brake-side pipe portions 12A to 12D can be directly connected without providing the ESC 11, that is, with omission of the ESC 11.

The vehicle data bus 16 includes a controller area network (CAN) serving as a serial communication unit mounted in the vehicle body 1, and is configured to perform multiplex communication inside the vehicle among a large number of electronic devices, the control unit 13, the parking brake control device 19, and the like, which are mounted in the vehicle. In this case, vehicle information to be transmitted to the vehicle data bus 16 includes information (vehicle information) based on defection signals from, for example, the brake operation detection sensor 6A, pressure sensors 17 configured to detect the master cylinder hydraulic pressures (brake hydraulic pressures), an ignition switch, a seat belt sensor, a door lock sensor, a door opening sensor, a seating sensor, a vehicle-velocity sensor, a steering-angle sensor, an accelerator sensor (accelerator operation sensor), a throttle sensor, an engine rotation sensor, a stereo camera, a millimeter wave radar, a gradient sensor, a shift sensor, an acceleration sensor, a wheel-velocity sensor, and a pitch sensor configured to detect movement of the vehicle in a pitch direction.

A parking brake switch (PKB SW illustrated in FIG. 2) 18 is provided in the vicinity of a driver's seat (not shown) inside the vehicle body 1. The parking brake switch 18 is operated by a driver. The parking brake switch 18 is configured to transmit, to the parking brake control device 19, a signal (actuation request signal) corresponding to an actuation request (application request or release request) for the parking brake from the driver. Specifically, the parking brake switch 18 outputs, to the parking brake control device 19 serving as a control unit (controller), the signal (application request signal or release request signal) for application actuation or release actuation of brake pads 33 (see FIG. 3) based on drive (rotation) of electric motors 43B.

When the parking brake switch 18 is operated to a braking side by the driver, specifically, when the application request (maintaining request or drive request) to apply the braking force to the vehicle is given, the application request signal is output from the parking brake switch 18. In this case, power for rotating the electric motors 43B to the braking side is fed from the parking brake control device 19 to the disc brakes 31 for the rear wheels 3. As a result, the disc brakes 31 for the rear wheels 3 are brought into a state in which the braking force as parking brakes or auxiliary brakes is applied, that is, an applied state.

Meanwhile, when the parking brake switch 18 is operated to a braking release side by the driver, specifically, when the release request (releasing request) to release the braking force for the vehicle is given, the release request signal is output from the parking brake switch 18. In this case, power for rotating the motors in a direction opposite to the braking side is fed from the parking brake control device 19 to the electric motors 43B for the disc brakes 31. As a result, the disc brakes 31 for the rear wheels 3 are brought into a state in which the application of the braking force as the parking brakes or the auxiliary brakes is released, that is, a release state.

In the following description, an operation for applying the parking brake, specifically, an operation for applying predetermined pressing forces (clamping forces) to the brake pads 33 illustrated in FIG. 3 to maintain a piston 39 in a braking state is referred to as "application". Further, an operation for releasing the parking brake, specifically, an operation for releasing a maintained state of the pistons 39 to cancel the clamping forces is referred to as "release".

The parking brake may be automatically applied (auto-applied) based on an automatic application request given in accordance with an application determination logic for the parking brake in the parking brake control device 19, for example, when the vehicle is in a stopped state for predetermined time period, specifically, the vehicle is determined as being in a stopped state based on continuation of a state in which a velocity detected by the vehicle-velocity sensor is lower than 4 km/m for predetermined time period along with deceleration during running, when an engine is stopped, when a shift lever is operated to a P (parking) position, when a door is opened, or when a sheet belt is unfastened. Further, the parking brake may be automatically released (auto-released) based on an automatic release request given in accordance with a release determination logic for the parking brake in the parking brake control device 19, for example, when the vehicle is in a running state, specifically, the vehicle is determined as being in a running state based on continuation of a state in which a velocity detected by the vehicle-speed sensor is 5 km/h or higher for predetermined time period along with acceleration from the stopped state, when an accelerator pedal is operated, when a clutch pedal is operated, or when the shift lever is placed in a position other than P (parking) and N (neutral).

Further, when a dynamic application request is given through the parking brake switch 18 during running of the vehicle, for example, when a so-called parking brake request to use the parking brake as the auxiliary brake so as to perform emergency stop control is given during running, the application and the release of the braking force can he automatically performed (ABS control) by the parking brake control device 19 in accordance with a state of the wheels (the rear wheels 3), specifically, whether or not the wheels are locked (skidded).

Next, the parking brake control device 19 serving as a control unit of the brake device is described with reference to FIG. 2.

The parking brake control device 19 constructs an electric brake system (brake device) together with the pair of left and right disc brakes 31. The parking brake control device 19 includes a computation circuit (CPU) 20 constructed by a microcomputer or the like, a memory (storage unit) 21, a voltage sensor unit 22, motor drive circuits 23, and current sensor units 24. The computation circuit 20, the memory 21, the voltage sensor unit 22, the motor drive circuits 23, and the current sensor units 24 of the parking brake control device 19 are not always required to be provided in a single casing (not shown), and may be constructed as independent bodies.

The computation circuit 20, the memory 21, and each of the motor drive circuits 23 of the parking brake control device 19 construct a control unit configured to perform the application control for applying the braking force to the vehicle through feeding of power to the electric motor 43B described later and the release control for releasing the braking force. Each of the current sensor units 24 constructs a current monitoring unit configured to monitor a motor current caused to flow through each of the electric motors 43B while detecting the motor current.

Power is supplied from the battery 14 to the parking brake control device 19 through the power supply line 15. The parking brake control device 19 controls the electric motors 43B of the disc brakes 31 to generate the braking force (parking brake or auxiliary brake) when the vehicle is parked or stopped, or during running as needed. Specifically, the parking brake control device 19 controls drive of the electric motors 43B to actuate the disc brakes 31 as the parking brakes, or as auxiliary brakes as needed. For this reason, as illustrated in FIG. 1 to FIG. 3, an input side of the parking brake control device 19 is connected to the vehicle data bus 16, the parking brake switch 18, and the like, whereas an output side is connected to the electric motors 43B of the disc brakes 31.

The parking brake control device 19 controls the drive of the electric motors 43B based on the actuation request (application request or release request) in response to the driver's operation on the parking brake switch 18, the actuation request in accordance with the application and release determination logics for the parking brakes, and the actuation request through the ABS control, to thereby perform application (maintaining) or release (releasing) for the disc brakes 31. The parking brake control device 19 can acquire, from the vehicle data bus 16, a plurality of pieces of vehicle information, for example, various state quantities of the vehicle, which are necessary for controlling the parking brakes. The vehicle information acquired from the vehicle data bus 16 may be acquired through direct connection of a sensor, which is configured to detect the information, to the parking brake control device 19.

The computation circuit 20 of the parking brake control device 19 may be configured so that the actuation request based on the determination logics or the ABS control described above is input from another control device, for example, the control unit 13 connected to the vehicle data bus 16. In this case, the determination of application and release of the parking brakes in accordance with the determination logics described above and the ABS control can be performed by another control device, for example, the control unit 13 in place of the parking brake control device 19. In other words, the control performed by the parking brake control device 19 can be integrated with those of the control unit 13.

In this embodiment, the parking brake control device 19 is constructed as being independent of the control unit 13 of the ESC 11. However, the parking brake control device 19 may be constructed integrally with the control unit 13. Further, although the parking brake control device 19 controls the two, that is, left and right disc brakes 31, the parking brake control device 19 may be provided for each of the left and right disc brakes 31. In this case, the parking brake control device 19 may be provided integrally with each of the disc brakes 31.

The memory 21 of the parking brake control device 19 constructs storage means (storage unit) constructed by, for example, a non-volatile memory, a ROM, a RAM, or an EEPROM. The memory 21 stores a processing program for executing control processing illustrated in FIG. 4 and FIG. 5, in addition to programs of the above-mentioned application and release determination logics for the parking brakes and the ABS control. Further, the memory 21 stores, in an updatable manner, a predetermined number of times of stepwise increase processing illustrated in FIG. 4, a first counter and a second counter (count values C1 and C2) and predetermined count threshold values Ca and Cb illustrated in FIG. 5, a first current threshold value Im1 and a second current threshold value Im2, a predetermined time period T1 for determining an inrush current (A0) and a predetermined time period T2 for determining completion of clamping illustrated in FIG. 6, and the like.

Figure 3:
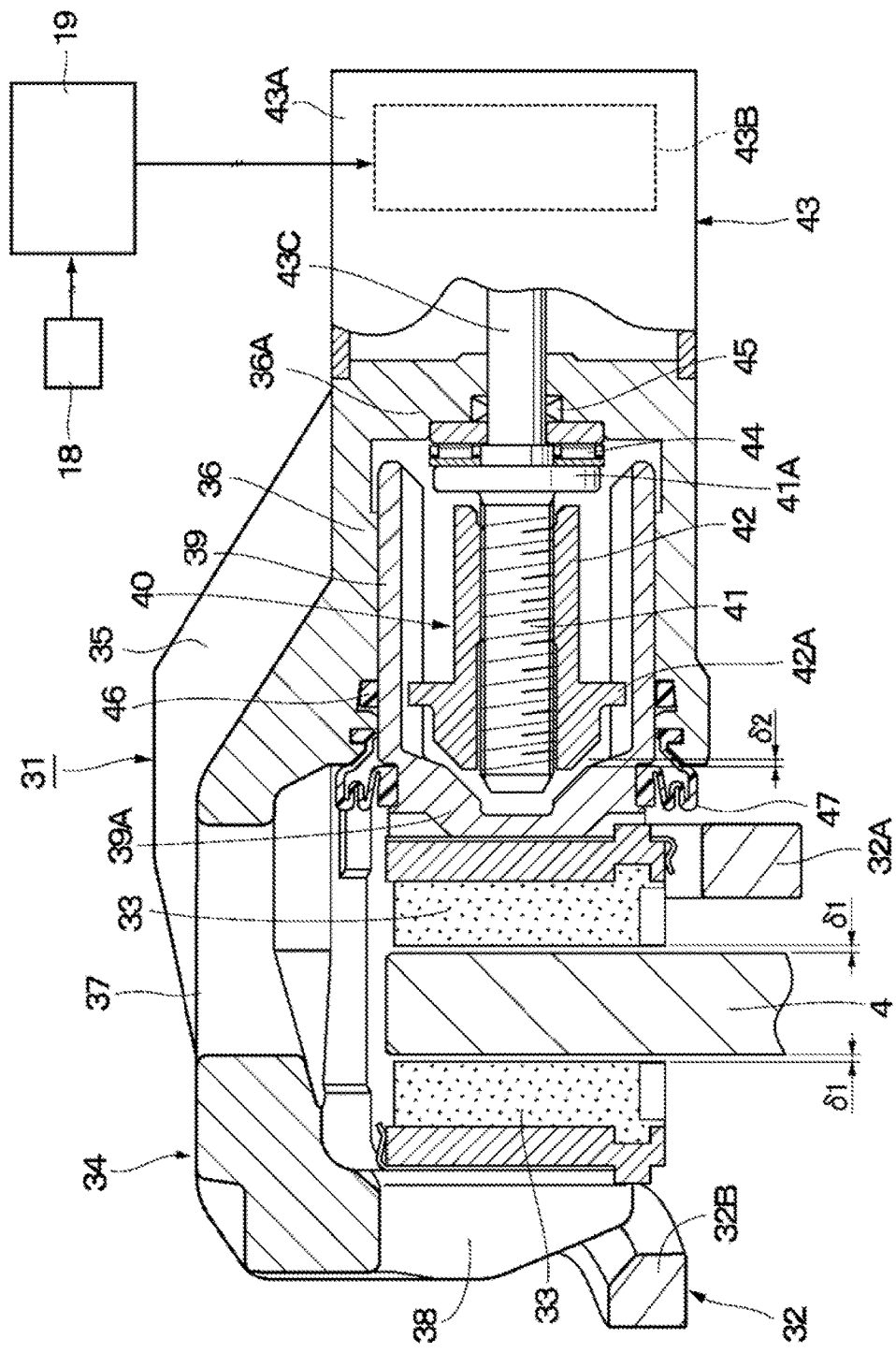
FIG. 3 is an enlarged vertical sectional view for illustrating a disc brake having an electric parking brake function, which is provided on a rear wheel side in FIG. 1.

Further, the control processing illustrated in FIG. 4 and FIG. 3 is a specific example of a stepwise increase control unit configured to increase the clamping force applied by braking members to the braked member in a stepwise manner. Specifically, the stepwise increase control unit is configured to execute control of performing feeding and stopping of power to the electric motor 43B for the predetermined number of times, which is set in advance, to increase the clamping force in a stepwise manner in accordance with the processing procedures illustrated in FIG. 4 and FIG. 5 when start of contact between the disc rotor 4 and the brake pads 33 through feeding of the power from the parking brake control device 19 to the electric motor 43B is detected based on the motor current from the current sensor unit 24.

Figure 2:
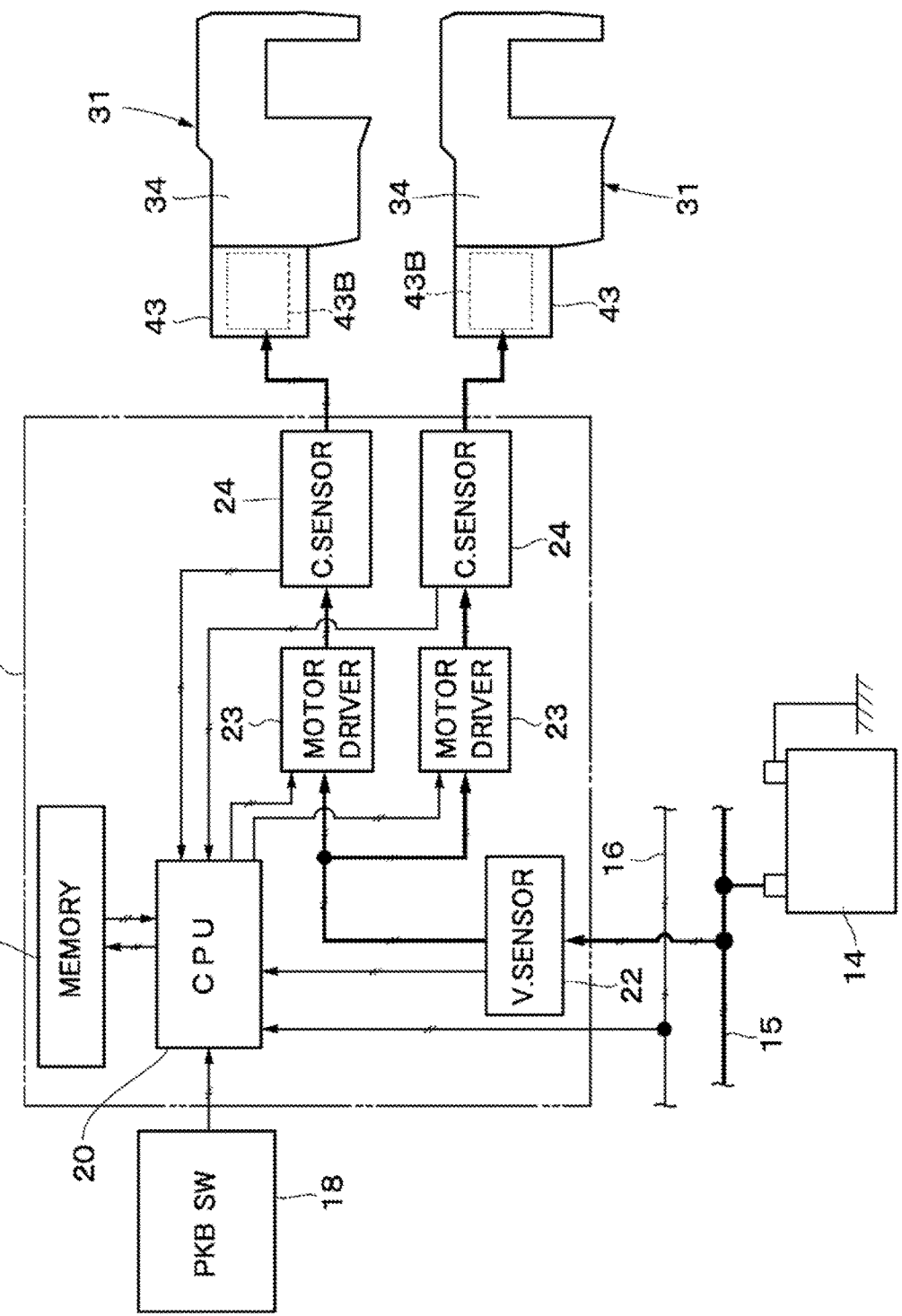
FIG. 2 is a block diagram for illustrating a parking brake control device illustrated in FIG. 1.

As illustrated in FIG. 2, the parking brake control device 19 includes the voltage sensor unit 22 configured to detect the voltage from the power supply line 15, the left and right motor drive circuits 23 configured to independently drive the electric motors 43B for the left and right disc brakes 31, the left and right current sensor units 24 serving as current monitoring units configured to individually detect the motor currents supplied to or caused to flow through the left and right electric motors 43B, and the like. The voltage sensor unit 22, the motor drive circuits 23, and the current sensor units 24 of the parking brake control device 19 are connected to the computing circuit 20.

In this manner, when the application or the release is performed, the computing circuit 20 of the parking brake control device 19 can, for example, determine contact and separation between the disc rotor 4 and the brake pads 33, and determine drive or stop of the electric motors 43B, specifically, determine completion of application or determine completion of release, based on a change in motor current Im (see, for example, FIG. 6) of the electric motor 43B detected by each of the current sensor units 24.

Next, a configuration of the disc brakes 31 having the electric parking brake function, which are provided on the side of the left and right rear wheels 3, is described with reference to FIG. 3. In FIG. 3, only one of the left and right disc brakes 31, which are provided so as to correspond to the left and right rear wheels 3, respectively, is illustrated as a representative example.

The pair of disc brakes 31 provided on the left and right of the vehicle, respectively, are constructed as the hydraulic disc brakes each having the electric parking brake function. The disc brakes 31 construct a brake system (brake device) together with the parking brake control device 19. Each of the disc brakes 31 includes a mounting member 32 to be mounted to a non-rotating portion on the rear wheel 3 side of the vehicle, the inner-side brake pad 33 and the outer-side brake pad 33 serving as the braking members, and a caliper 34 serving as a brake mechanism provided with an electric actuator 43.

In case, the disc brake 31 thrusts the brake pads 33 by the piston 39 with the hydraulic pressure based on the operation of the brake pedal 6 or the like to press the disc rotor 4 with the brake pads 33, thereby applying the braking force to the wheel (rear wheel 35 and eventually to the vehicle. Further, the disc brake 31 thrusts the piston 33 by the electric motor 43B through intermediation of a rotation-linear motion conversion mechanism 40 as described later to press the disc rotor 4 with the brake pads 33, thereby applying the braking force to the wheel (rear wheel 3) and eventually to the vehicle.

The mounting member 32 includes a pair of arm portions (not shown) extending in an axial direction of the disc rotor 4, specifically, a disc axis direction so as to extend over an outer periphery of the disc rotor 4 and being separated away from each other in a disc circumferential direction, a thick bearing portion 32A configured to couple base end sides of the arm portions integrally to each other and fixed to a non-rotating portion of the vehicle at a position on an inner side of the disc rotor 4, and a reinforcing beam 32B configured to couple distal end sides of the arm portions to each other at a position on an outer side of the disc rotor 4.

The inner-side brake pad 33 and the outer-side brake pad 33 are arranged so as to be able to come into contact with both surfaces or the disc rotor 4, and are supported by the respective arm portions of the mounting member 32 so as to be movable in the disc axis direction. When the braking by the disc brake 31 is released, a gap corresponding to a pad clearance δ1 (see FIG. 3) is formed between the inner-side brake pad 33 and the disc rotor 4 and between the outer-side brake pad 33 and the disc rotor 4. When the braking operation of the disc brake 31 is performed, the inner-side to brake pad 33 and the outer-side brake pad 33 are pressed against the both surface sides of the disc rotor 4 by the caliper 34 so that the above-mentioned pad clearances δ1 become zero. As a result, the brake pads 33 press the disc rotor 4, which is rotated together with the wheel (rear wheel 3), from the both surface sides to clamp the disc rotor 4, thereby applying the braking force to the vehicle.

The caliper 34 serving as a wheel cylinder is arranged on the mounting member 32 so as to extend over the outer peripheral side of the disc rotor 4. The caliper 34 includes a caliper main body 35 supported so as to be movable along the axial direction of the disc rotor 4 relative to the arm portions of the mounting member 32, the piston 39 inserted and fitted inside the caliper main body 35 so as to be displaceable in a sliding manner, the rotation-linear motion conversion mechanism 40, the electric actuator 43, and the like. The caliper 34 uses the piston 39 actuated by the hydraulic pressure generated based on the operation of the brake pedal 6 to thrust the brake pads 33.

The caliper main body 35 includes a cylinder portion 36, a bridge portion 37, and a claw portion 38. The cylinder portion 36 is formed into a bottomed cylindrical shape having one side in the axial direction closed by a partition wall portion 36A, and another side opposed to the disc rotor 4 being open. The bridge portion 37 is formed so as to extend from the cylinder portion 36 in the disc axis direction so as to extend over the outer peripheral side of the disc rotor 4. The claw portion 38 extends radially inward from the bridge portion 37 on a side opposite to the cylinder portion and is arranged so as to come into contact with a rear surface side of the outer-side brake pad 33.

The hydraulic pressure generated along with the depressing operation of the brake pedal 6 is supplied to the cylinder portion 36 of the caliper main body 35 via the brake-side pipe portion 12C or 12D illustrated in FIG. 1. The partition wall portion 36A is formed integrally with the cylinder portion 36. The partition wall portion 36A is positioned between the cylinder portion 36 and the electric actuator 43. The partition wall portion 36A has a through hole extending in the axial direction. On an inner peripheral side of the partition wall portion 36A, an output shaft 43C of the electric actuator 43 is rotatably inserted.

Inside the cylinder portion 36 of the caliper main body 35, the piston 39 serving as a pressing member (movable member) and the rotation-linear motion conversion mechanism 40 are provided. In this embodiment, the rotation-linear motion conversion mechanism 40 is housed inside the piston 39. However, the rotation-linear motion conversion mechanism 40 only needs to be configured to thrust the piston 39 and is not always required to be housed inside the piston 39.

The piston 39 moves the brake pads 33 toward the disc rotor 4 or in a direction away from the disc rotor 4. One axial side of the piston 39 is open, whereas another axial side thereof, which faces the inner-side brake pad 33, is closed by a lid portion 39A. The piston 39 is inserted inside the cylinder portion 36 so as to be displaceable in a sliding manner.

The piston 39 is moved in the axial direction inside the cylinder portion 36 through feeding of the current (energization) to the electric motor 43B of the electric actuator 43, and is also moved in the axial direction even through supply of the hydraulic pressure into the cylinder portion 36 based on the depressing operation of the brake pedal 6. In this case, the movement of the piston 39, which is caused by the electric actuator 43 (electric motor 43B), is performed through application of pressure by a linearly movable member 42. Further, the rotation-linear motion conversion mechanism 40 is housed inside the piston 39. The piston 39 is configured to be thrust in the axial direction of the cylinder portion 36 by the rotation-linear motion conversion mechanism 40.

The rotation-linear motion conversion mechanism 40 has functions of thrusting the piston 39 of the caliper 34 in the axial direction by an external force, specifically, a force generated by the electric actuator 43, which is different from a force generated by the supply of the hydraulic pressure into the cylinder portion 36, and retaining the thrust piston 39 and the brake pads 33 at those positions. As a result, the parking brake is brought into the applied state (retained state). Meanwhile, the rotation-linear movement conversion mechanism 40 causes the piston 39 to retreat by the electric actuator 43 in a direction opposite to the thrust direction to bring the parking brake into the release state (released state). Then, the left and right disc brakes 31 are provided to the left and right rear wheels 3, respectively, and therefore the rotation-linear motion conversion mechanisms 40 and the electric actuators 43 are also provided on the left and right of the vehicle, respectively.

The rotation-linear motion conversion mechanism 40 includes a thread member 41 having a bar-like body on which a male thread, for example, a trapezoidal thread is formed and the linearly movable member 42 having a female thread hole formed by the trapezoidal thread on an inner peripheral side as a spindle nut mechanism. The linearly movable member 42 serves as a driven member (thrust member) to be moved toward the piston 39 or in a direction away from the piston 39 by the electric actuator 43. Specifically, the thread member 41 threadably fitted to the inner peripheral side of the linearly movable member 42 constructs a thread mechanism configured to convert a rotational motion of the electric actuator 43 into a linear motion of the linearly movable member 42. In this case, the female thread of the linearly movable member 42 and the male thread of the thread member 41 are formed using a thread having a large irreversibility, which is the trapezoidal thread in this embodiment, thereby constructing a pressing-member retaining mechanism.

Specifically, the rotation-linear motion conversion mechanism 40 is constructed as the pressing-member retaining mechanism configured to retain the linearly movable member 42, specifically, the piston 39 at a suitable position by a frictional force (retention force) even under a state in which the feeding of power to the electric motor 43B is stopped. The pressing-member retaining mechanism only needs to retain the piston 39 at the position thrust by the electric actuator 43, and may be, for example, a general screw having a triangular cross section or a worm gear, with a large irreversibility other than the trapezoidal thread.

The thread member 42 provided so as to be threadably fitted on the inner peripheral side of the linearly movable member 42 is provided with a flange portion 41A being a flange portion having a large diameter on one axial side. Another axial side of the thread member 41 extends toward the lid portion 39A of the piston 39. The thread member 41 is coupled integrally with the output shaft 43C of the electric actuator 43 at the flange portion 41A. Further, on an outer peripheral side of the linearly movable member 42, an engagement projecting portion 42A, which is configured to allow relative movement of the linearly movable member 42 in the axial direction while preventing rotation or restricting relative rotation of the linearly movable member 42 relative to the piston 39, is provided. In this manner, the linearly movable member 42 is moved linearly by driving the electric motor 43B to come into contact with the piston 39, to thereby move the piston 39 in the axial direction.

The electric actuator 43 is fixed to the caliper main body 35 of the caliper 34. The electric actuator 43 actuates (applies or releases) the disc brake 31 based on the actuation request signal from the parking brake switch 18, the application and release determination logics for the parking brake, and the ABS control described above. The electric actuator 43 includes a casing 43A, the electric motor 43B, a speed reducer (not shown), and the output shaft 43C. The casing 43A is mounted on an outer side of the partition wall portion 36A. The electric motor 43B is positioned inside the casing 43A, and includes a stator, a rotor, and the like to move the piston 39 in the axial direction with the feeding of power (current). The speed reducer (not shown) is configured to decelerate the rotation of the electric motor 43B to increase a torque. The output shaft 43C is configured to output the rotation torque after amplification by the speed reducer.

The electric motor 43B can be constructed as, for example, a DC brush motor. The output shaft 43C extends to pass through the partition wall portion 36A of the cylinder portion 36 in the axial direction and is coupled to an end portion of the flange portion 41A of the thread member 41 inside the cylinder portion 36 so as to rotate integrally with the thread member 41. A coupling mechanism between the output shaft 430 and the thread member 41 can be constructed, for example, so as to be movable in the axial direction and be prevented from being rotated in a rotating direction. In this case, a publicly-known technology, for example, spline fitting or fitting with a polygonal column (non-circular fitting) is used.

As the speed reducer, for example, a planetary gear speed reducer, a worm gear speed reducer, or the like may be used. When a publicly-known speed reducer without reverse operationality (with irreversibility) such as the worm gear speed reducer is used, a publicly-known mechanism with reversibility such as a ball screw or a ball-and-ramp mechanism can be used. In this case, the pressing-member retaining mechanism can be constructed by, for example, a reversible rotation-linear motion conversion mechanism and an irreversible speed reducer.

When the driver of the vehicle operates the parking brake switch 18, the power is fed to the electric motor 43B via the parking brake control device 19 to rotate the output shaft 43C of the electric actuator 43. As a result, the thread member 41 of the rotation-linear motion conversion mechanism 40 is rotated integrally with the output shaft 43C in one direction to thrust (drive) the piston 39 via the linearly movable member 42 toward the disc rotor 4. At this time, the disc rotor 4 is sandwiched between the inner-side brake pad 33 and the outer-side brake pad 33 from both sides in the axial direction to bring the disc brake 31 into a state in which the braking force is applied as the electric parking brake, specifically, the applied state (retained state).

Meanwhile, when the parking brake switch 18 is operated to the braking release side, the thread member 41 of the rotation-linear motion conversion mechanism 40 is rotationally driven in another direction (opposite direction) by the electric actuator 43. As a result, the linearly movable member 42, and the piston 39 in a case without application of the hydraulic pressure, are driven in the direction away from the disc rotor 4 to bring the disc brake 31 into a state in which the application of the braking force as the parking brake is released, that is, a released state (release state). In this case, a clearance for a gap δ2 illustrated in FIG. 3 is formed between the lid portion 39A of the piston 33 and a distal end of the linearly movable member 42.

In the rotation-linear motion conversion mechanism 40, when the thread member 41 is rotated relative to the linearly movable member 42, the rotation of the linearly movable member 42 is restricted inside the piston 39. Therefore, the linearly movable member 42 is moved relatively in the axial direction in accordance with an angle of rotation of the thread member 41. In this manner, the rotation-linear motion conversion mechanism 40 converts the rotational motion into the linear motion so that the piston 39 is thrust by the linearly movable member 42 in the axial direction. Further, along therewith, the rotation-linear motion conversion mechanism 40 retains the linearly movable member 42 at a suitable position with a frictional force generated between the linearly movable member 42 and the thread member 41, thereby retaining the piston 39 and the brake pads 33 at positions after the thrust by the electric actuator 43.

On the partition wall portion 36A of the cylinder portion 36, a thrust bearing 44 is provided between the partition wall portion 36A and the flange portion 41A of the thread member 41. The thrust bearing 44 receives application of a thrust load from the thread member 41 together with the partition wall portion 36A so as to smoothen the notation of the thread member 41 relative to the partition wall portion 36A. Further, a sealing member 45 is provided between the partition wall portion 36A of the cylinder portion 36 and the output shaft 43C of the electric actuator 43. The sealing member 45 seals between the cylinder portion 36 and the electric actuator 43 so as to prevent the brake fluid inside the cylinder portion 36 from leaking to the electric actuator 43 side.

On an open end side of the cylinder portion 36, there are provided a piston seal 46 and a dust boot 47. The piston seal 46 serves as an elastic seal configured to seal between the cylinder portion 36 and the piston 39. The dust boot 47 is configured to prevent entry of a foreign matter into the cylinder portion 36. The dust boot 47 is a bellows-shaped sealing member having flexibility, and is mounted between the open end of the cylinder portion 36 and an outer periphery of the piston 39 on a side closer to the lid portion 39A.

Each of the disc brakes 5 for the front wheels 2 has a configuration which is substantially the same as that of each of the disc brakes 31 for the rear wheels 3 except for the parking brake mechanism. Specifically, each of the disc brakes 5 for the front wheels 2 does not include the rotation-linear motion conversion mechanism 40, the electric actuator 43, and the like included in each of the disc brakes 31 for the rear wheels 3, which are actuated as the parking brakes. In place of the disc brakes 5, however, the disc brakes 31, each having the electric parking brake function, may be provided for the front wheels 2.

Next, a gradual increase request illustrated in FIG. 4 is described. The gradual increase request corresponds to a case where, for example, the parking brake control device 19 receives any of the following requests (A) to (C) from the vehicle data bus 16 or the like. However, the request signals (A) to (C) are merely representative examples, and the request signals are not limited thereto.

The request signal (A) is a request signal for inspection of the clamping force at the time of braking, which is generated through clamping of the disc rotor 4 between the pair of brake pads 33, in a pre-shipment inspection carried out before shipment of a vehicle from a factory. The request signal (B) is a request signal for inspection of the clamping force at the time of braking, which is similarly generated through clamping of the disc rotor 4 between the pair of brake pads 33, when a regular inspection, specifically, an automobile inspection obligated for vehicles is carried out. The request signal (C) is a request signal generated when emergency stop control is performed as a so-called dynamic parking brake for actuation of the disc brake 31 (electric parking brake) during running.

In this case, the request signals (A) and (8) are output, for example, when a signal for identifying that the inspection is carried out is received from each of wheel-velocity sensors (not shown) for the front and rear wheels by a dedicated inspection device (not shown), which is configured to stop rotation of the front wheels of the vehicle and to rotate only the rear wheels, and the parking brake switch 18 is operated to the braking side. When any one of the request signals (A) and (B) is acquired, the parking brake control device 19 determines that the gradual increase request has been given. The request signals (A) and (B) may be the same signal. Specifically, the parking brake control device 19 is not required to determine whether an inspection is the pre-shipment inspection or an inspection for the automobile inspection, and only needs to determine whether or not the gradual increase request has been given in any of the cases.

The request signal (C) is output during running of the vehicle or under a state in which whether the vehicle is running or stopping is unknown, for example, due to a failure of the vehicle-velocity sensor or the like when the parking brake switch 18 is operated to the braking side. When the request signal (C) is acquired, the parking brake control device 19 can determine that the gradual increase request has been given.

Next, stepwise increase control for the clamping force, which is performed in accordance with the processing procedures illustrated in FIG. 4 and FIG. 5 when the gradual increase request described above is given, is described with reference to time-series data from a time Ta1 to a time Ta12 shown in FIG. 6.

Figure 6:
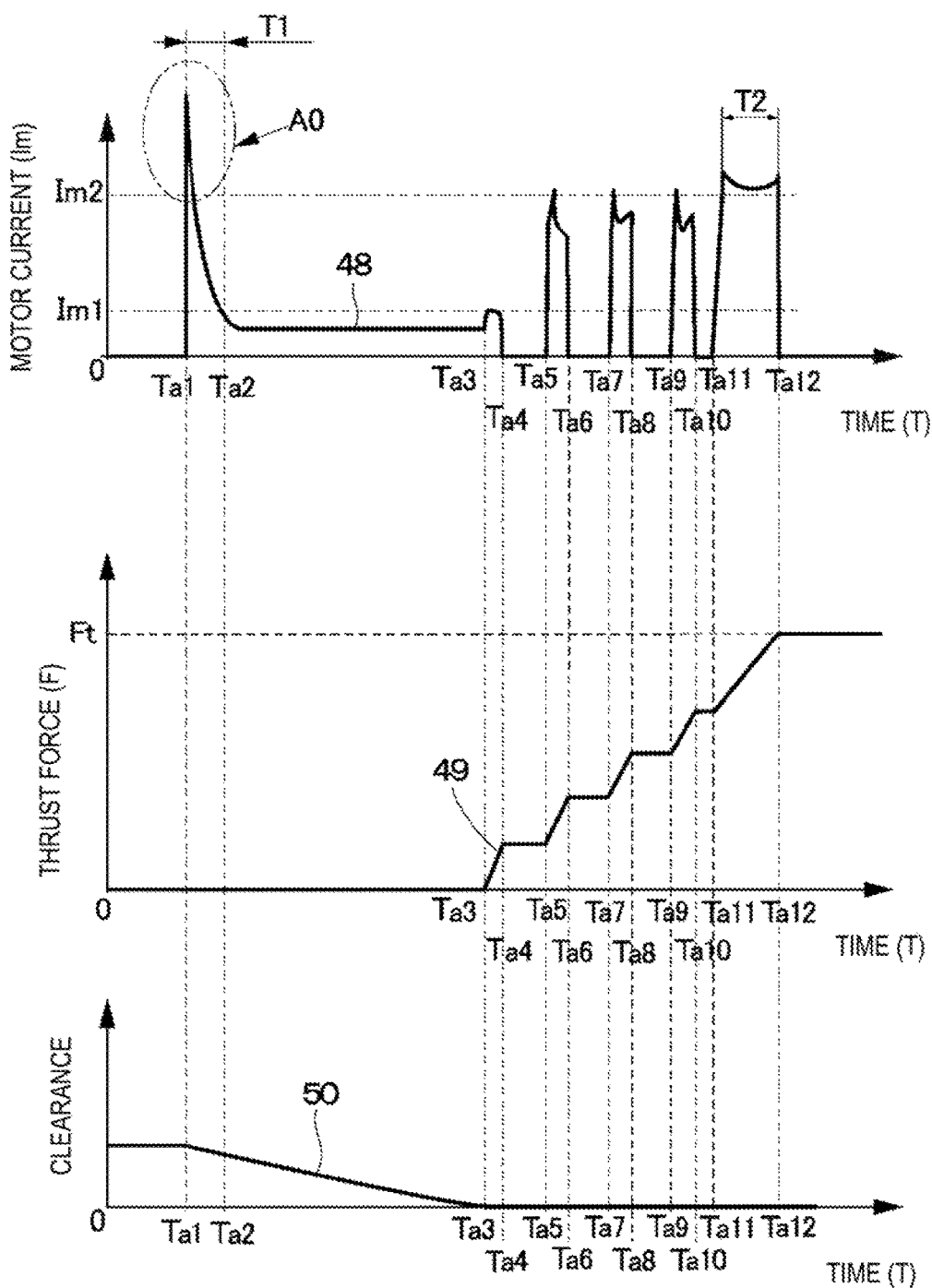
FIG. 6 is a characteristic line graph for showing, in time series, a change characteristic of a motor current, a change characteristic of a thrust force of a rotation-linear motion conversion mechanism, and a change characteristic of a pad clearance, which are caused by the stepwise increase control for the clamping force.

A characteristic line 48 of FIG. 6 represents a change characteristic of the motor current Im of the electric motor 43B at the time of application when the parking brake switch 18 is operated to the braking side. A characteristic line 49 represents a characteristic of a thrust force F, specifically, the clamping force generated in the rotation-linear motion conversion mechanism 40 through driving of the electric actuator 43. A characteristic line 50 represent a change characteristic of the clearance, for example, the pad clearance δ1 between the disc rotor 4 and each of the brake pads 33 illustrated in FIG. 3. The gap δ2 (see FIG. 3) generated between the lid portion 39A of the piston 39 and the distal end of the linearly movable member 42 may be included as a part of the clearance.

Specifically, the characteristic line 50 of FIG. 6 represents a change characteristic of the clearance. The clearance may be obtained as a sum value of the pad clearances δ1 and the gap δ2 described above. The characteristic line 59 represents the change characteristic of the clearance described above as time-series data from the time Ta1 to the time Ta12 with a relationship between the motor current Im (characteristic line 48) of the electric motor 43B and the thrust force F (characteristic line 49) of the rotation-linear motion conversion mechanism 40.

When the parking brake switch 18 is operated to the braking side to output an application command at the time Ta1 shown in FIG. 6, the power is fed to the electric motor 43B to turn the motor current Im into the inrush current (A0) to rise with a peak, as represented by the characteristic line 48. Specifically, immediately after the energization of or the start of the feeding of power to the electric motor 43B, the electric actuator 43 (electric motor 43B) transitions from a stopped state to a driving state from the time Ta1 to the time Ta2 shown in FIG. 6. Therefore, after the large inrush current (A0) having the peak as represented by the characteristic line 48 is generated, the electric actuator 43 (electric motor 43B) is brought into the driving state. As a result, the motor current Im of the electric motor 43B is gradually decreased.

The inrush current (A0) is a current that is not substantially involved in the generation of the clamping force.

Therefore, as represented by the characteristic line 49 shown in FIG. 6, the thrust force F of the brake is zero, that is, F=0. A predetermined time period T1 from the time Ta1 to the time Ta2 in FIG. 6 is a time period known as a characteristic of the inrush current (A0). Publicly-known mask processing or the like is performed over the predetermined time period T1 so as to prevent erroneous determination due to the inrush current (A0) for detection and monitoring of the motor current Im.

A first current threshold value Im1 shown in FIG. 6 is a threshold value that is preset so as to detect a contact start position between the disc rotor 4 and the brake pads 33 based on the motor current Im obtained from the current sensor unit 24, and is set to a current value larger than a current value obtained when the electric motor 43B has no load or is operated under no load, as represented by the characteristic line 48. A second current threshold value Im2 is a threshold value that is preset so as to determine whether or not the thrust force F, specifically, the clamping force has reached a target thrust force, and is set to a value smaller than the current value of the motor current Im at completion of the application described below, for example, at the time Ta12.

As a method of confirming the contact start position at which the pair of brake pads 33 starts coming into contact with the disc rotor 4, specifically, at a time of start of generation of the clamping force by the thrust force F, the current value of the motor current Im (characteristic line 48) flowing through the electric motor 43B before the generation of the clamping force, specifically, when the clearance is reduced from the time Ta1 to the time Ta3 of FIG. 6, as represented by the characteristic line 50 is stored. A time at which the current value becomes larger than the current value by a predetermined value or larger, specifically, a time at which the motor current Im reaches the first current threshold value Im1 shown in FIG. 6 can be estimated as the time of generation of the clamping force.

As described above, when the start of contact between the disc rotor 4 and the brake pads 33 is detected at the time at which the motor current Im obtained from the current sensor unit 24 reaches the first current threshold value Im1 from the time Ta3 to a time Ta4 of FIG. 6, the stepwise increase processing illustrated in FIG. 5 is executed based on the detection. In this case, as a method of increasing the clamping force in a stepwise manner, the electric motor 43B is stopped after being driven in an application direction for a preset power feeding time period, for example, 30 ms. Thereafter, after being delayed for a preset stop time period, for example, about one second, the method can be achieved through repeated driving and stopping of the electric motor 43B again in the application direction for the preset power feeding time period.

The stepwise increase processing for increasing the clamping force in a stepwise manner is performed through repeated feeding and stopping of the power to the electric motor 43B for three times (that is, a predetermined number of times) in total, that is, from the time Ta4 to the time Ta6, from the time Ta6 to a time Ta8, and from the time Ta8 to a time Ta10, as represented by the characteristic line 48 shown in FIG. 6. In this case, the stop time period for stopping the feeding of power to the electric motor 43B is preset to a time period, for example, about one second. Meanwhile, the power feeding time period for the feeding of power to the electric motor 43B is preset to, for example, 30 ms. Thus, with the power feeding time period shorter than the stop time period, the feeding and stopping of power to the electric motor 43B are repeatedly performed for the predetermined number of times.

In this manner, the thrust force F (clamping force) generated in the rotation-linear motion conversion mechanism 40 is kept constant from the time Ta4 to a time Ta5 and is increased in a stepwise manner from the time Ta1 to the time Ta6, as represented by the characteristic line 49 of FIG. 6. Similarly, the thrust force F (clamping force) is kept constant from the time Ta6 to a time Ta7 and from the time Ta8 to a time Ta9 and is increased in a stepwise manner from the time Ta7 to the time Ta8 and from the time Ta9 to the time Ta10. Specifically, while clamping the disc rotor 4 between the brake pads 33, the disc brake 31 increases the clamping force (pressing force) in a stepwise manner at this time.

After the number of times of the stepwise increase processing reaches the predetermined number, the feeding of power to, that is, continuous energization of the electric motor 43B is performed from a time Ta11 to the time Ta12. As a result, the motor current Im becomes a current value equal to or larger than a second current threshold value Im2 over a predetermined time period T2. In this manner, it can be determined that the thrust force F generated in the rotation-linear motion conversion mechanism 40 has increased to a thrust force value Ft being a target, as represented by the characteristic line 49. The disc brake 31 applies a predetermined pressing force (clamping force) to the brake pads 33 under a state in which the thrust force F reaches the target thrust force value Ft, thereby completing the clamping, specifically, completing the application.

As described above, when the motor current Im becomes equal to or larger than the second current threshold value Im2 over the predetermined time period T2, the parking brake control device 19 stops the energization of the electric motor 43B at the time Ta12 to stop the electric motor 43B, thereby completing the application (see Step S8 of FIG. 4). The predetermined time period T2 is also a time period for preventing erroneous determination of the completion of application due to rippled noise superimposed on the motor current Im. When filtering processing is performed independently, the completion of application can be identified merely by determining whether or not the motor current Im is equal to or larger than the second current threshold value Im2. Further, the second current threshold value Im2 may be corrected in accordance with inclination of a road surface on which the vehicle is parked or a magnitude of the hydraulic pressure P inside the disc brake 31 (caliper 34).

The brake device for a four-wheeled automobile according to this embodiment has the configuration described above. Next, actuation thereof is described.

When the driver of the vehicle performs the depressing operation of the brake pedal 6, the stepping force is transmitted to the master cylinder 8 via the booster 7 to generate the brake hydraulic pressure by the master cylinder 8. The brake hydraulic pressure generated in the master cylinder 8 is supplied to the respective disc brakes 5 and 31 via the cylinder-side hydraulic pressure pipes 10A and 10B, the ESC 11, and the brake-side pipe portions 12A, 12B, 12C, and 12D, thereby applying the brake forces to the left and right front wheels 2 and the left and right rear wheels 3.

Similarly to the front-wheel 2 side, the hydraulic pressures are respectively applied even to the disc brakes 31 for the rear wheels 3 via the brake-side pipe portions 12C and 12D into the cylinder portion 36 of the caliper 34. In accordance with an increase in hydraulic pressure inside the cylinder portion 36, the piston 39 is displaced in a sliding manner in the axial direction toward the inner-side brake pad 33. As a result, the piston 39 presses the inner-side brake pad 33 toward one side surface of the disc rotor 4. Through a reaction force generated at this time, the entire caliper 34 is displaced in a sliding manner in the axial direction toward the inner side relative to each of the arm portions of the mounting member 32.

As a result, the outer leg portion (claw portion 38) of the caliper 34 operates so as to press the outer-side brake pad 33 against the disc rotor 4, and hence the disc rotor 4 is clamped (sandwiched) between the pair of brake pads 33 from both sides in the axial direction. As a result, the braking force based on the hydraulic pressure is generated. Meanwhile, when the brake operation is released, the supply of the hydraulic pressure into the cylinder portion 36 is stopped, thereby displacing the piston 39 into the cylinder portion 36 in a retracting manner. As a result, the inner-side brake pad 33 and the outer-side brake pad 33 are separated from the disc rotor 4 to return the vehicle into a non-braked state.

Next, when the driver of the vehicle operates the parking brake switch 18 to the braking side, the feeding of power to or the energization of the electric motor 43B of the disc brake 31 is performed from the parking brake control device 19 to rotationally drive the output shaft 43C of the electric actuator 43. The disc brake 31 having the electric parking brake function converts the rotational motion of the electric actuator 43 into the linear motion of the linearly movable member 42 via the thread member 41 of the rotation-linear motion conversion mechanism 40 to move the linearly movable member 43 in the axial direction, thereby thrusting the piston 39. As a result, the pair of brake pads 33 is pressed against the both surfaces of the disc rotor 4.

At this time, the linearly movable member 42 is retained in a braking state by the frictional force (retention force) generated with the thread member 41 by a pressing reaction force transmitted from the piston 39. The disc brakes 31 for the rear wheels 3 are actuated (applied) as the parking brakes. Specifically, even after the feeding of power to the electric motor 43B is stopped, the linearly movable member 42 and eventually the piston 39 are retained at the braking position by the female thread formed on the linearly movable member 42 and the male thread formed on the thread member 41.

Meanwhile, when the driver operates the parking brake switch 18 to the braking release side, the power is fed to the electric motor 43B from the parking brake control device 19 so that the motor is reversely rotated. The output shaft 43C of the electric actuator 43 is rotated in a direction opposite to that during the actuation (application) of the parking brake. At this time, the retention of the braking force by the thread member 41 and the linearly movable member 42 is released. The rotation-linear motion conversion mechanism 40 moves the linearly movable member 42 in a return direction, specifically, into the cylinder portion 36 by the amount of movement corresponding to the amount of reverse rotation of the electric actuator 43, thereby releasing the braking force of the parking brake (disc brake 31). At this time, the clearance for the gap δ2 illustrated in FIG. 3 is ensured between the lid portion 39A of the piston 39 and the linearly movable member 42.

For the disc brake 31 having the electric parking brake function, the disc rotor 4 is clamped between the pair of brake pads 33 so as to inspect the clamping force generated at the time of braking, for example, at the time of shipment from a factory. Further, a similar inspection is carried out even at the regular inspection, specifically, the automobile inspection obligated for vehicles. As a method of inspecting the clamping force described above, it is desired to perform the stepwise increase control for gradually increasing the clamping force through intermittent repetition of the energization of the electric motor 43B.

Further, when the emergency stop control is performed so as to actuate the disc brake 31 as the so-called dynamic parking brake, it is desired to increase the clamping force in a stepwise manner when the gradual increase request is given, for example, in case of a failure of the wheel-velocity sensor. The electric parking brake device actuates the disc brake 31 as the dynamic parking brake so as to perform the emergency stop control, for example, when the service brake becomes faulty while the vehicle is running. Even when the emergency stop control described above is performed, the clamping force is desired to be increased in a stepwise manner when the gradual increase request is issued, for example, in case of a failure of the wheel-velocity sensor or the like.

However, the disc brake 31 has the gaps (see FIG. 3) for the pad clearance δ1 between each of the pair of brake pads 33, and the disc rotor 4 before the disc rotor 4 is clamped between the pair of brake pads 33. Further, there is the clearance for the gap δ2 between the lid portion 39A of the piston 39 and the distal end of the linearly movable member 42. Therefore, when the control for increasing (raising) the clamping force in a stepwise manner is started before the generation of the clamping force, specifically, before the clearance becomes zero, needless motor stop time is generated while the clearance (pad clearances δ1 and gap δ2) is being reduced. As a result, time required until the generation of the clamping force becomes longer. When the number of times of clamping is limited so as to suppress the increase in time, the number of times of clamping reaches an upper limit in early time in a case where the control for increasing the clamping force in a stepwise manner is started before the generation of the clamping force. As a result, the clamping force becomes insufficient.

Meanwhile, when timing to start the control for increasing the clamping force in a stepwise manner is late, the clamping force becomes excessively large. As described above, when the control for generating the clamping force in a stepwise manner is started in early time, the clamping force becomes insufficient in some cases. On the contrary, when the start timing is late, there arises a problem in that the clamping force becomes excessive. In particular, when the control for increasing the clamping force in a stepwise manner while monitoring the motor current of the electric motor 43B is performed without using a position sensor configured to detect a position of the piston 39 or the like and/or a clamping-force sensor, there is a fear of occurrence of the problems described above.

Therefore, in this embodiment, through the stepwise increase control for the braking force generated by the disc brake 31, specifically, for the clamping force generated by the parking brake control device 19 in accordance with the processing procedure illustrated in FIG. 4, the clamping force on the disc rotor 4 applied by each of the brake pads 33 can be appropriately increased in a plurality of steps, thereby suppressing insufficiency or excessiveness of the clamping force.

Specifically, after the processing operation illustrated in FIG. 4 is started. In Step S1, the parking brake control device 19 determines whether or not the gradual increase request has been given. The gradual increase request corresponds to reception of any of the above-mentioned request signals (A) to (C) by the parking brake control device 19. In this case, it is determined as "YES" in Step S1. When it is determined as "NO" in Step S1, the gradual increase request has not been given. Therefore, the processing proceeds to Step S5 to return.

When it is determined as "YES" in Step S1, it is then determined in next Step S2 whether or not the thrust force is before being generated. The determination processing is performed through detection of whether or not the inrush current (A0) has been generated, for example, as indicated by the characteristic line 48 of the motor current Im shown in FIG. 6. Specifically, immediately after the energization of or start of the feeding of power to the current motor 43B, the electric actuator 43 (electric motor 43B) transitions from the stopped state to the driving state from the time Ta1 to the time Ta2 shown in FIG. 6. Therefore, after the generation of the large inrush current (A0) having a peak as represented by the characteristic line 48, the electric actuator 43 (electric motor 43B) is brought into the driving state. As a result, the motor current Im of the electric motor 43B is gradually decreased.

Therefore, in the determination processing in Step S2, it is determined whether or not the thrust force is before being generated based on whether or not the generation of the inrush current (A0) has been detected over, for example, the predetermined time period T1 from the time Ta1 to the time Ta2 shown in FIG. 6. In the processing in Step S2, whether or not the predetermined time period T1, for example, from the time Ta1 to the time Ta2 has elapsed from the start of the drive of the electric motor 43B is determined by using, for example, a timer (not shown) or the like.

When it is determined as "YES" in Step S2, the thrust force F becomes zero, for example, at the time Ta2 (see the characteristic line 49 of FIG. 6) and is therefore in the state before the generation of the thrust force. Thus, the processing proceeds to next Step S3. In Step S3, for example, from the time Ta2 to the time Ta4 of FIG. 6, the electric motor 43B is continuously energized. As a result, the electric motor 43B drives the electric actuator 43 so that the linearly movable member 42 (piston 39) is moved in a direction closer to the disc rotor 4. In subsequent Step S4, it is determined whether or not the target thrust force has been generated. While the result of determination is "NO", the processing returns in Step S5.

The determination processing for the target thrust force in Step S4 is performed to determine whether or not the thrust force F generated in the rotation-linear motion conversion mechanism 40 has increased to the thrust force value Ft being the target, as represented by the characteristic line 49 of FIG. 6. Specifically, when the motor current Im of the current motor 43B, which is equal to or larger than the second current threshold value Im2, is continuously generated over the predetermined time period T2, it can be determined that the piston 39 has reached an original braking position. In this manner, the generation of the target thrust force is determined.

However, the electric actuator 43 (electric motor 43B) is being operated under no load from the time Ta2 to the time Ta3 of FIG. 6, and hence the thrust force F generated in the rotation-linear motion conversion mechanism 40 is kept to zero for a while. Specifically, as illustrated in FIG. 3, there is the pad clearance δ1 between the disc rotor 4 and each of the brake pads 33, whereas the gap δ2 (clearance) in the axial direction is formed between the lid portion 39A of the piston 39 and the distal end of the linearly movable member 42. Therefore, until the linearly movable member 42 is displaced in the axial direction by the gap δ2 so as to come into contact with the lid portion 39A of the piston 39 and each of the brake pads 33 is displaced in the axial direction by the pad clearance δ1, specifically, until the disc rotor 4 and each of the brake pads 33 start coming into contact with each other, the electric motor 43B is being substantially operated under no load.

As described above, while the electric motor 43B is being operated under no load, the processing from Step S1 to Step S5 of FIG. 4 is repeated. As a result, it is not determined as "NO" in Step S2. Through the processing in Step S3, the continuous energization is continuously performed. As represented by the characteristic line 50 of FIG. 6, however, when the clearance becomes zero at the time Ta3, the brake pads 33 start coming into contact with both surfaces of the disc rotor 4. Along therewith, the thrust force F of the rotation-linear motion conversion mechanism 40 starts increasing from the time Ta3 to the time Ta4, as represented by the characteristic line 49. Therefore, the motor current Im monitored (detected) by the current sensor unit 24 is increased to a value exceeding the first current threshold value Im1 set to the current value larger than the current value under no load.

Therefore, the parking brake control device 19 detects the start of contact between each of the brake pads 33 (braking members) and the disc rotor 4 (braked member) through the feeding of power to the electric motor 43B based on whether or not the motor current Im from the current sensor unit 24 has exceeded the first current threshold value Im1. At this time, the thrust force F of the rotation-linear motion conversion mechanism 40 starts increasing from the time Ta3 to the time Ta4 as represented by the characteristic line 49, and hence the generation of the thrust force is detected. Therefore, after it is determined as "NO" in Step S2 of FIG. 4, the processing proceeds to subsequent Step S6.

In Step S6, whether or not the stepwise increase processing has been performed for a predetermined number of times, for example, three times in subsequent Step S7, specifically, the number of times of the stepwise increase processing is smaller than the predetermined number of times. As long as it is determined as "YES" in Step S6, the stepwise increase processing in subsequent Step S7 is performed in accordance with a procedure illustrated in FIG. 5, which is described later. Meanwhile, when it is determined as "NO" in Step S6, the stepwise increase processing has been performed only for three times which is the predetermined number of times. Therefore, the processing proceeds to subsequent Step S3 where the electric motor 43B is continuously energized as described later, for example, as shown in a time period from the time $T_{a11}$ to the time Ta12 of FIG. 6.

Here, the stepwise increase processing illustrated in FIG. 5 is performed when the start of contact between each of the brake pads 33 and the disc rotor 4 caused by the feeding of power to the electric motor 43B is detected based on the motor current Im obtained from the current sensor unit 24, specifically, when the motor current Im increases to the first current threshold value Im1 or longer from the time Ta3 to the time Ta4 of FIG. 6.

First, in Step S11 of FIG. 5, it is determined whether or not the stepwise increase processing is performed for the first time. For example, at the time Ta4 of FIG. 6, the stepwise increase processing is the first stepwise increase processing. Therefore, it is determined as "YES" in Step S11. Then, the processing proceeds to subsequent Step S12 where the feeding of power to the electric motor 43B is stopped to stop the electric motor 43B. In subsequent Step S13, is determined whether or not the electric motor 43B is in the stopped state. As long as it is determined as "YES" in Step S13, the processing proceeds to subsequent Step S14 where the count value C1 of the first counter is incremented by "1" as "C1←C1+1".

In subsequent Step S15, it is determined whether or not the count value C1 of the first counter has become equal to or larger than the predetermined count threshold value Ca, that is, a count value corresponding to, for example, about one second which is a time period from the time Ta4 to the time Ta5 of FIG. 6. As long as it is determined as "NO" in Step S15, the processing proceeds to Step S22 to return so as to repeat the processing after Step S11. In this case, the electric motor 43B is in the stopped state from the time Ta4 to the time Ta5 of FIG. 6. Therefore, if is determined as "YES" in Step S13. In this manner, the processing for incrementing the count value C1 of the first counter by "1" is repeated in subsequent Step S14. Then, when it is determined as "YES" in subsequent Step S15, the electric motor 43B is stopped, for example, from the time Ta4 to the time Ta5 of FIG. 6. As a result, the count value C1 of the first counter has reached the predetermined count threshold value Ca.

Therefore, in subsequent Step S16, the count value C1 of the first counter is reset to zero as C1=0. Then, in subsequent Step S17, the continuous energization of, specifically, the feeding of power to the electric motor 43B is performed. As a result, the electric motor 43B drives the electric actuator 43 so as to displace the linearly movable member 42 (piston 39) in the direction closer to the disc rotor 4 with the thrust force so that the pair of brake pads 33 clamps the disc rotor 4. In subsequent Step S18, the count value C2 of the second counter is incremented by "1" as an increment "C2←C2+1".

In subsequent Step S19, it is determined whether or not the count value C2 of the second counter has become equal to or larger than the predetermined count threshold value Cb, that is, count value corresponding to, for example, about 30 ms which is a time period from the time TaS to the time Ta6 of FIG. 6. As long as it is determined as "NO" in Step S19, the processing proceeds to Step S22 to return so as to repeat the processing after Step S11. In this case, from the time Ta5 to the time Ta6 of FIG. 6, the electric motor 43B is driven by the feeding of power, specifically, continuous energization in Step S17. Therefore, it is determined as "NO" in Step S13.

As a result, the processing proceeds to subsequent Step S17 where the continuous energization is continued. In subsequent Step S18, processing for incrementing the count value C2 of the second counter by "1" is repeated. Then, when it is determined as "YES" in Step S19, the electric motor 43B is driven by the continuous energization, for example, from the time Ta5 to the time TaS of FIG. 6. As a result, the count value C2 of the second counter has reached the predetermined count threshold value Cb.

Therefore, in subsequent Step S20, the count value C2 of the second counter is reset to zero as C2=0. Then, in subsequent Step S21, the feeding of power to the electric motor 43B is stopped to stop the electric motor 43B. Thereafter, the processing returns in Step S22 to terminate the first stepwise increase processing performed from the time Ta4 to the time Ta6 of FIG. 6. In this step, a count value (not shown) of the number of times of the stepwise increase is counted as, for example, "1".

Next, the second and subsequent stepwise increase processing is described. In this case, the second stepwise increase processing is performed by repeating processing similar to that in Step S11 to Step S22 described above from the time $T_{a6}$ to the time $T_{a8}$ of FIG. 6. In the second and subsequent stepwise increase processing, however, it is determined as "NO" in Step S11. Therefore, the processing after Step S13 is repeated. Then, from the time $T_{a6}$ to the time $T_{a7}$ of FIG. 6, for example, about one second which is a time period required for the count value C1 of the first counter to reach the predetermined count threshold value Ca, the feeding of power to the electric motor 43B is stopped.

Meanwhile, from the subsequent time Ta7 to the time Ta8, for example, about 30 ms which is a time period required for the count value C2 of the second counter to reach the predetermined count threshold value Cb, the power is fed to the electric motor 43B to rotationally drive the motor 43B. In this manner, the electric motor 43B drives the electric actuator 43 to displace the linearly movable member 42 (piston 39) with the thrust force in the direction closer to the disc rotor 4 so that the pair of brake pads 33 clamps the disc rotor 4. Then, when the second stepwise increase processing from the time Ta6 to the time Ta8 of FIG. 6 is completed, the count value of the number of times of the stepwise increase is counted as, for example, "2".

Next, the third stepwise increase processing is performed by repeating the processing similar to that in Step S11 to Step S22 described above from the time Ta8 to the time Ta10 of FIG. 6. From the time Ta8 to the time Ta9, for example, about 1 second which is a time period required for the count value C1 of the first counter to reach the predetermined count threshold value Ca, the feeding of power to the electric motor 43B is stopped. From the subsequent time Ta9 to the time Ta10, for example, about 30 ms which is a time period required for the count value C2 of the second counter to reach the predetermined count threshold value Cb, the power is fed to the electric motor 43B to rotationally drive the motor 43B. Then, when the third stepwise increase processing from the time Ta8 to the time Ta10 of FIG. 6 is completed, the count value of the number of times of the stepwise increase is counted as, for example, "3".

As described above, when the count value of the number of times of the stepwise increase becomes "3", it is determined as "NO" in the determination processing in Step S6 of FIG. 4. The stepwise increase processing has been performed three times which is the predetermined number of times, and therefore the processing proceeds to subsequent Step S3 where the electric motor 43B is continuously energized, for example, as shown in a time period from the time Ta11 to the time Ta12 shown in FIG. 6. As a result, the electric motor 43B drives the electric actuator 43 to displace the linearly movable member 42 (piston 39) toward the disc rotor 4 with a larger thrust force so that the pair of brake pads 33 clamps the disc rotor 4 with a larger force.

In subsequent Step S4, it is determined whether or not the clamping force (thrust force F) has increased to the thrust force value Ft being the target, as represented by the characteristic line 49 of FIG. 6. Specifically, when the motor current Im of the electric motor 43B has a value equal to or larger than the second current threshold value Im2 for the predetermined time period T2 from the time Ta11 to the time Ta12 as represented by the characteristic line 48 of FIG. 6, it can be determined that the piston 39 has reached the original braking position so that the clamping force (thrust force F) is increased to the thrust force value Ft being the target. As a result, in Step S4, it is determined that the target thrust force is generated and determined as "YES".

Meanwhile, as long as it is determined as "NO" in Step S4 of FIG. 4, the thrust force F (clamping force) generated by the rotation-linear motion conversion mechanism 40 has not reached the target thrust force. Thus, after the processing returns in Step S5, the continuous energization is continued in subsequent Step S3. Then, when it is determined as "YES" in Step S4, the thrust force F (clamping force) represented by the characteristic line 49 has increased to the thrust force value Ft being the target, for example, at the time Ta12 of FIG. 6. Therefore, in subsequent Step S8, the feeding of power to the electric motor 43B is stopped to stop the electric motor 43B.

In this manner, the actuation of the rotation-linear motion conversion mechanism 40 in the application direction is completed to retain the piston 39 in the braking position. Specifically, the disc brake 31 applies the predetermined pressing force (clamping force) to the disc rotor 4 between the brake pads 33. In this step, the clamping is completed. Then, in subsequent Step S9, the count of the number of times of the stepwise increase is initialized to reset the count value to zero, thereby terminating the control processing at the time of application, which is performed by the parting brake control device 19.

As described above, according to this embodiment, the control unit including the computing circuit 20, the memory 21, and the motor drive circuits 23 of the parking brake control device 19 includes the stepwise increase control unit configured to increase the clamping force to the disc rotor 4 applied by the brake pads 33 in a stepwise manner. When detecting the start of contact between the disc rotor 4 and the brake pads 33 by the feeding of power from the parking brake control device 19 to the electric motor 43B based on the motor current obtained from the current sensor unit 24, the stepwise increase control unit performs the feeding and stopping of power to the electric motor 43B for a preset predetermined number of times so that the control for increasing the clamping force in a stepwise manner is executed in accordance with the processing procedures illustrated in FIG. 4 and FIG. 5.

With the configuration described above, the position of start of contact at which the pair of brake pads 33 starts coming into contact with the disc rotor 4, specifically, time at which the clamping force generated by the thrust force F is started to be generated, can be detected as the time at which the motor current Im flowing through the current motor 43B (characteristic line 48 of FIG. 6) reaches the first current threshold value Im1. In this manner, the electric motor 43B is not required to be stopped needlessly while the clearance before the generation of the clamping force (thrust force F) is being reduced, as in the time period from the time Ta1 to the time Ta3 of FIG. 6. Then, the time of generation of the clamping force can be detected. As a result, motor driving time until the generation of the clamping force (thrust force F) can be shortened.

Then, after the time of generation of the clamping force, the clamping force (thrust force F) is increased in a stepwise manner, as in the time period from the time Ta5 to the time Ta6, the time period from the time Ta7 to the time Ta8, and the time period from the time Ta9 to the time Ta10. In this manner, an appropriate upper limit of the number of times of clamping, for example, three can be controlled. Thus, the clamping force does not become insufficient or excessive. Thus, the stepwise increase control for the clamping force can be appropriately performed by the brake device.

Therefore, according to this embodiment, the stepwise increase control for the braking force generated by the disc brake 31, specifically, the clamping force from the parking brake control device 19 is performed in accordance with the processing procedures illustrated in FIG. 4 and FIG. 5. As a result, the clamping force to the disc rotor 4, which is generated by each of the brake pads 33, can be appropriately increased in a plurality of steps. Thus, insufficiency and excessiveness of the clamping force generated by the disc brake 11 can be suppressed.

Further, when braking as the parking brake or releasing the braking, the disc brake 31 constantly detects (monitors) the current value of the motor current Im caused to flow through the electric motor 43B from the motor drive circuit 23 of the parking brake control device 19 by the current sensor unit 24, thereby controlling the drive and the stop of the electric motor 43B based on the detection value. In this manner, it is not necessary to detect the pressing force (clamping force) of the brake pad 33 on the disc rotor 4 with the clamping-force sensor or the like or to detect a position of movement of the piston 39 by the position sensor or the like. The actuation and the release as the parking brake can be controlled. Thus, the number of sensors can be reduced.

In this embodiment, the case where the stepwise increase control for increasing the clamping force in a stepwise manner is performed three times as the predetermined number of times has been described as an example. However, the present invention is not limited thereto. The stepwise increase control may be performed for a predetermined number of times, for example, twice or four or more times. The predetermined number of times in this case is determined in accordance with a type of vehicle based on data of a previously carried out experiment. Although the predetermined number of times may be a pre-defined number of times, the predetermined number of times may be variable in accordance with a change in conditions such as a battery voltage.

Further, in this embodiment, the case where the start of contact between the disc rotor 4 and the brake pads 33 caused by the feeding of power to the electric motor 43B is detected based on the motor current obtained from the current sensor unit 24, specifically, a current monitoring unit serving as a contact detecting unit has been described as an example. However, the present invention is not limited thereto. The start of contact between the disc rotor 4 (braked member) and the brake pads 33 (braking members) may be detected by the contact detecting unit other than the current monitoring unit, for example, the position sensor configured to detect the position of the piston or the braking member and/or the thrust-force sensor configured to detect the clamping force or the like.

Meanwhile, in this embodiment, the case where the disc brakes 31, each having the parking brake function, are used as the left and right rear-wheel side brakes has been described as an example. However, the present invention is not limited thereto. The left and right front-wheel side brakes may be disc brakes, each having the electric parking brake function, or the brakes for all the wheels (all the four wheels) may be made up of the disc brakes, each having the electric parking brake function.

Further, in this embodiment, the hydraulic disc brakes 31, each with the electric parking brake, have been described as an example. However, the present invention is not limited thereto. The disc brakes may be electric disc brakes without requiring supply of the hydraulic pressure. Further, the disc brake may be configured as a drum-brake type brake device without being limited to the disc-brake type brake device. Further, there can be adopted various types of brake mechanisms such as a drum-in-disc brake including a drum-type electric parking brake provided to a disc brake or a configuration for retaining the parking brake by pulling a cable by an electric motor. For example, when the electric brake mechanism without requiring the supply of the hydraulic pressure is adopted, the control unit can be configured to apply the braking force to the vehicle as a service brake, or to drive the electric motor based on the application request given by the operation of the brake pedal or the like.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention. The above-mentioned embodiments may be combined as appropriate.

The present application claims priority from the Japanese Patent Application No. 2014-266809. The entire disclosure including Specification, Scope of Claims, Drawings, and Abstract of Japanese Patent Application No. 2014-266809 filed on Dec. 27, 2014 is incorporated herein in its entirety by reference.

REFERENCE SIGNS LIST 1 vehicle body, 2 front wheel (wheel), 3 rear wheel (wheel), 4 disc rotor (braked member), 6 brake pedal, 16 vehicle data bus, 18 parking brake switch, 19 parking brake control device (control unit), 21 memory, 23 motor drive circuit (motor driver), 24 current sensor unit (current monitoring unit), 33 brake pad (braking member), 39 piston, 40 rotation-linear motion conversion mechanism, 41 thread member, 42 linearly movable member, 43 electric actuator, 43B electric motor, Im motor current, F thrust force (clamping force)

The invention claimed is:

1. A brake device, comprising:
braking members configured to clamp a braked member, which is rotated together with a wheel, to apply a braking force to a vehicle;
a piston configured to move the braking members toward the braked member or in a direction away from the braked member;
an electric motor;
a linearly movable member configured to move linearly through driving of the electric motor and come into contact with the piston so as to move the piston;
a control unit configured to perform application control for applying the braking force to the vehicle through feeding of power to the electric motor and release control for releasing the braking force applied to the vehicle; and
a wheel-velocity sensor,
wherein, in the presence of a non-zero signal output from the wheel-velocity sensor, the control unit continuously energizes the electric motor until start of contact between the braking members and the braked member is detected, and the control unit performs, when start of contact between the braking members and the braked member is detected, stepwise increase control for increasing in a stepwise manner a clamping force applied by the braking members to the braked member through repeated actuating and stopping of power to the electric motor.

2. A brake device according to claim 1, wherein the control unit is configured to perform actuating and stopping of power to the electric motor with a stop time period for stopping the feeding of power to the electric motor and a power feeding time period shorter than the stop time period.

3. A brake device according to claim 1, wherein the control unit is configured to feed power to the electric motor through continuous energization until the clamping force reaches a predefined predetermined clamping force at a time at which the feeding and stopping of power to the electric motor are performed for a predetermined number of times.

4. A brake device according to claim 2, wherein the control unit is configured to feed power to the electric motor through continuous energization until the clamping force reaches a predefined predetermined clamping force at a time at which the feeding and stopping of power to the electric motor are performed for a predetermined number of times.

5. A brake device, comprising:
braking members configured to clamp a braked member, which is rotated together with a wheel, to apply a braking force to a vehicle;
a piston configured to move the braking members toward the braked member or in a direction away from the braked member;
an electric motor;
a linearly movable member configured to move linearly through driving of the electric motor and come into contact with the piston so as to move the piston;
a control unit configured to perform application control for applying the braking force to the vehicle through feeding of power to the electric motor and release control for releasing the braking force to the vehicle;
a current monitoring unit configured to monitor a motor current caused to flow though the electric motor; and
a wheel-velocity sensor,
wherein, in the presence of a non-zero signal output from the wheel-velocity sensor, the control unit includes a stepwise increase control unit configured to, when start of contact between the braking members and the braked member caused by continuously energizing the electric motor is detected based on the motor current monitored by the current monitoring unit, increase in a stepwise manner a clamping force applied by the braking members to the braked member by performing the actuating and stopping of power to the electric motor for a set predetermined number of times.

6. A brake device according to claim 5, wherein the control unit is configured to perform actuating and stopping of power to the electric motor with a stop time period for stopping the feeding of power to the electric motor and a power feeding time period shorter than the stop time period.

7. A brake device according to claim 5, wherein the control unit is configured to feed power to the electric motor through continuous energization until the clamping force reaches a predefined predetermined clamping force at a time at which the feeding and stopping of power to the electric motor are performed for a predetermined number of times.

8. A brake device according to claim 6, wherein the control unit is configured to feed power to the electric motor through continuous energization until the clamping force reaches a predefined predetermined clamping force at a time at which the feeding and stopping of power to the electric motor are performed for a predetermined number of times.

9. A brake device, comprising:
braking members configured to press a braked member, which is rotated together with a wheel, to apply a braking force to a vehicle;
a control unit configured to perform application control for applying the braking force to the vehicle through feeding of power to an electric actuator and release control for releasing the braking force to the vehicle; and a wheel-velocity sensor, wherein the brake device is configured to press the braking members toward the braked member by the electric actuator so as to retain a pressing force of the braking members, and wherein, in the presence of a non-zero signal output from the wheel-velocity sensor, the control unit continuously energizes the electric actuator, until start of contact between the braking members and the braked member is detected, and then performs stepwise increase control for increasing in a stepwise manner the pressing force applied by the braking members to the braked member by through repeated actuating and stopping of power to the electric actuator.

10. A brake device according to claim 9, wherein the control unit is configured to perform actuating and stopping of power to the electric actuator with a stop time period for stopping the feeding of power to the electric actuator and a power feeding time period shorter than the stop time period.

11. A brake device according to claim 9, wherein the control unit is configured to feed power to the electric actuator through continuous energization until the pressing force reaches a predefined predetermined pressing force at a time at which the actuating and stopping of power to the electric actuator are performed for a predetermined number of times.

12. A brake device according to claim 10, wherein the control unit is configured to feed power to the electric actuator through continuous energization until the pressing force reaches a predefined predetermined pressing force at a time at which the actuating and stopping of power to the electric actuator are performed for a predetermined number of times.

* * * * *